US008248995B2

(12) United States Patent
Mark et al.

(10) Patent No.: US 8,248,995 B2
(45) Date of Patent: Aug. 21, 2012

(54) WIRELESS COMMUNICATIONS USING FREQUENCY AGILE RADIO

(75) Inventors: Brian L. Mark, Fairfax, VA (US); Ahmed Omar Nasif, Fairfax, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 561 days.

(21) Appl. No.: 12/402,191

(22) Filed: Mar. 11, 2009

(65) Prior Publication Data
US 2009/0232121 A1 Sep. 17, 2009

Related U.S. Application Data

(60) Provisional application No. 61/035,497, filed on Mar. 11, 2008.

(51) Int. Cl.
*H04W 4/00* (2009.01)
(52) U.S. Cl. ............... 370/328; 370/338; 455/456.1; 455/456.2
(58) Field of Classification Search .......... 370/328, 370/338; 455/456, 456.1
See application file for complete search history.

(56) References Cited

U.S. PATENT DOCUMENTS

| 2004/0022214 A1* | 2/2004 | Goren et al. ............ 370/332 |
| 2007/0191022 A1* | 8/2007 | Yanagihara ........... 455/456.1 |
| 2007/0263566 A1 | 11/2007 | McHenry et al. |
| 2008/0200187 A1* | 8/2008 | Lin et al. ............... 455/456.6 |

* cited by examiner

*Primary Examiner* — Gary Mui
*Assistant Examiner* — Richard K Chang
(74) *Attorney, Agent, or Firm* — David Grossman

(57) ABSTRACT

A frequency agile radio configured to determine an estimated coverage area of a primary transmitter is disclosed. The radio includes at least one position device configured to determine a position coordinate of the radio and generate a corresponding position signal. The radio also includes at least one frequency agile receiver configured to measure a power of a transmission at least one frequency and generate a corresponding signal. Additionally, the radio includes at least one controller in communication with the at least one position device and the at least one frequency agile receiver. The controller is configured to determine a plurality of position coordinates of the radio and a plurality of signal power datums. The controller is also configured to estimate the coverage area of the at least one primary transmitter, based on the determined plurality of position coordinates and the determined plurality of signal power datums.

27 Claims, 12 Drawing Sheets

WIRELESS COMMUNICATIONS USING FREQUENCY AGILE RADIO

CROSS-REFERENCE TO RELATED APPLICATIONS

This application claims the benefit of U.S. Provisional Application No. 61/035,497, filed Mar. 11, 2008, entitled "Estimation of Spatial Spectrum Holes via Signal Strength Measurements," which is hereby incorporated by reference in its entirety.

STATEMENT REGARDING FEDERALLY SPONSORED RESEARCH OR DEVELOPMENT

This invention was made with government support under Grant Numbers CNS-0520151 and ECS-0426925 awarded by the National Science Foundation. The government has certain rights in the invention.

DETAILED DESCRIPTION OF EMBODIMENTS

The present disclosure relates generally to wireless communications and, more particularly, to a method and system for facilitating wireless communications with minimal interference with transmissions of a primary transmitter.

Figure 1:
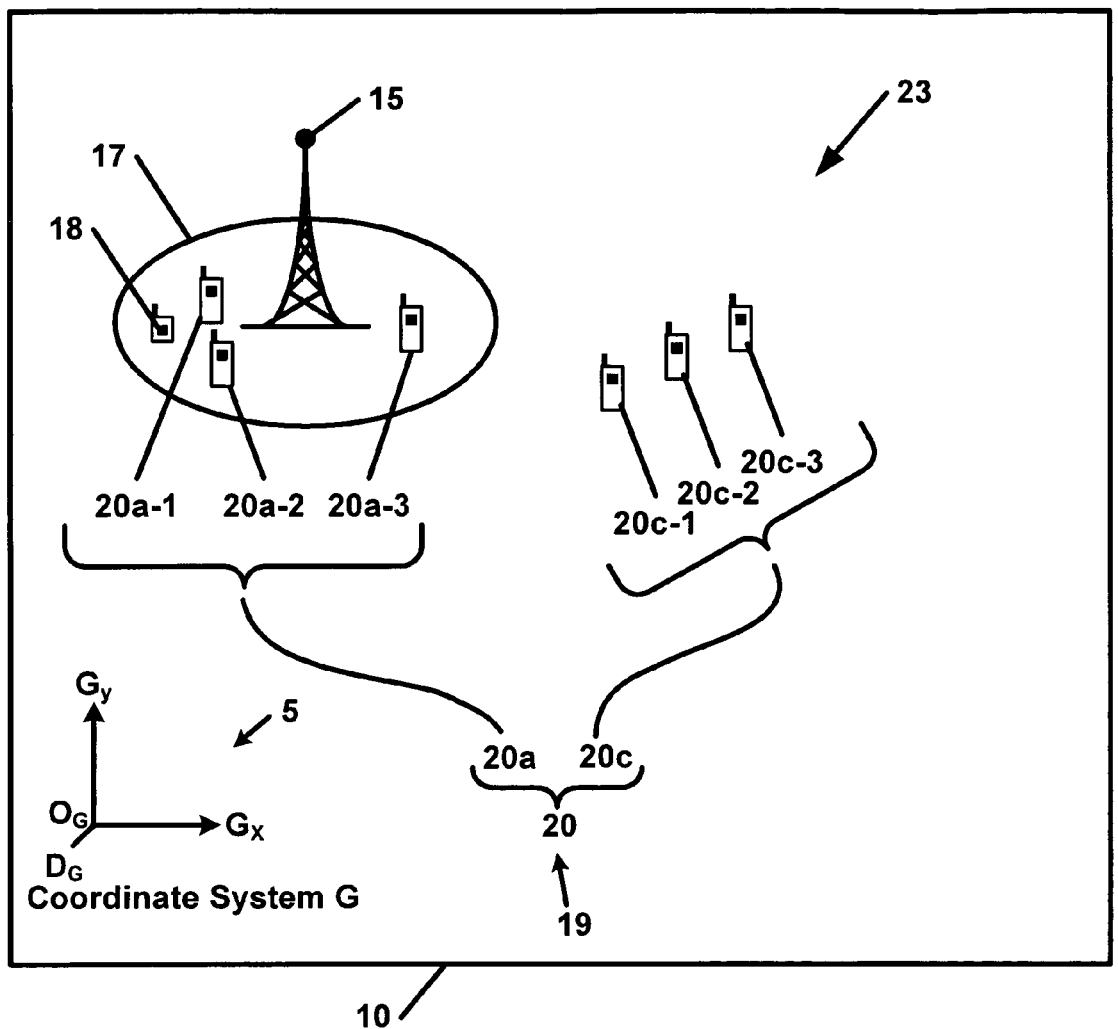
FIG. 1 is a pictorial illustration of a plurality of frequency agile radios and a primary transmitter operating within a communications site, according to an aspect of an embodiment of the present invention.

FIG. 1 illustrates a communications site 10. Communications site 10 may be, for example, a land area, a water area, a sky area, or another type of area known in the art. In some embodiments, communications site 10 may be located within a friendly or an unfriendly area. For example, communications site 10 may be located within a war zone, a natural disaster area, or another area in which it may be desirable to facilitate wireless communications.

One or more primary transmitters 15 may be located within communications site 10. In one embodiment, primary transmitter 15 may transmit information at a certain frequency and at a certain power. Primary transmitter 15 may have a coverage area 17 within which a primary user 18 (also referred to as a victim receiver) may receive this information from primary transmitter 15. Coverage area 17 may be circular as transmissions of primary transmitter 15 may be omnidirectional. In other words, transmissions of primary transmitter 15 may be transmitted in all directions. Alternatively, transmissions of primary transmitter 15 may be directional. In other words, transmissions of primary transmitter 15 may be transmitted in only certain directions. In yet another alternative, transmissions of primary transmitter 15 may have varied powers depending on direction. For example, in some directions, the transmissions of primary transmitter 15 may be at one power while in other directions the transmissions of primary transmitter 15 may be at another power. Additionally, the power of primary transmitter 15 in some directions may vary due to attenuation by interfering objects.

A communications system 19 may also be located within communications site 10. Communications system 19 may include one or more frequency agile radios 20. For example, communications system 19 may include frequency agile radios 20a, which may be located within coverage area 17. Communications system 19 may also include frequency agile radios 20c, which may be located in a spectrum hole 23. Spectrum hole 23 may be defined as an area in which primary users 18 may be unlikely to receive information from primary transmitter 15 at a certain frequency. In other words, spectrum hole 23 may include an area devoid of transmissions above a designated power at the certain frequency.

Figure 2:
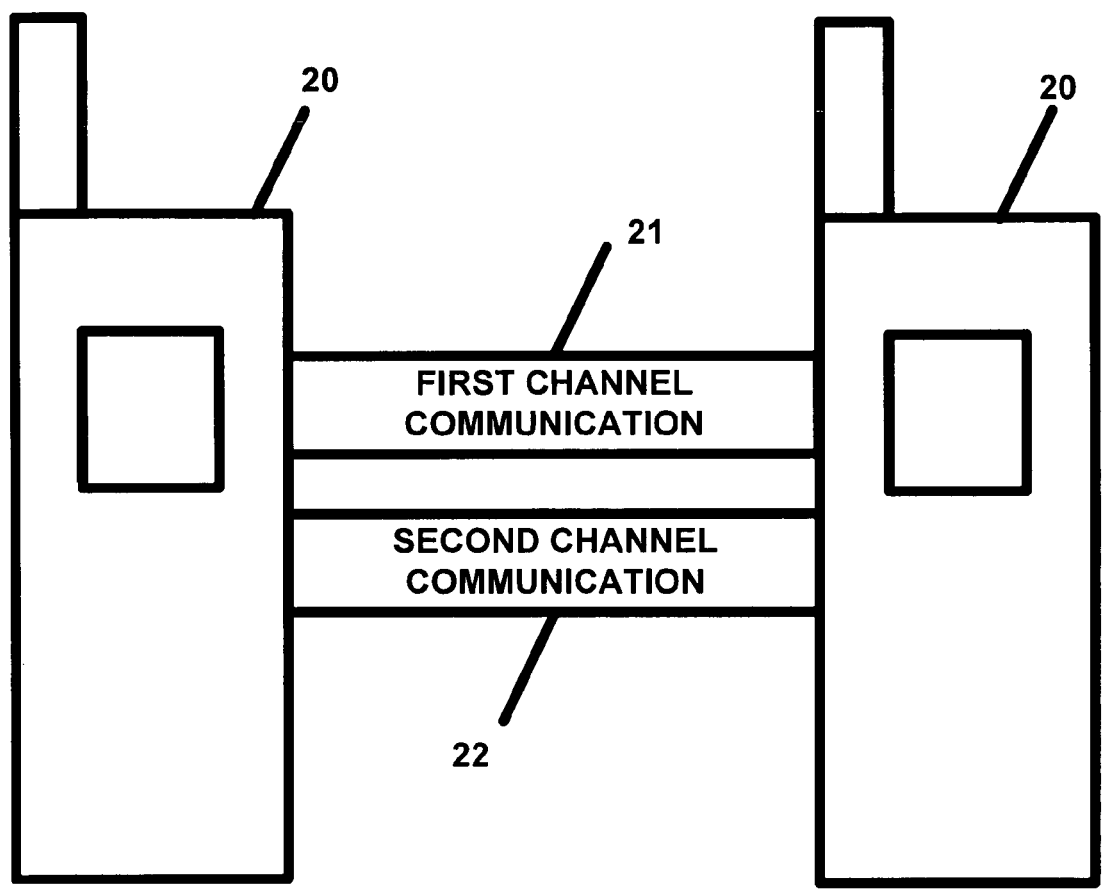
FIG. 2 is a diagrammatic illustration of a plurality of frequency agile radios in communication with each other, according to an aspect of an embodiment of the present invention.

As illustrated in FIG. 2, frequency agile radios 20 may be in first channel communication 21 and/or second channel communication 22 with each other. Through the first channel communication 21, frequency agile radios 20 may be able to transmit information to each other. For example, first channel communication 21 may include wired or wireless communication, morse code, facsimile, visual, auditory, human, or another form of communication. In one embodiment, the first channel communication 21 may include low bandwidth communication. The second channel communication 22 may also allow for transmission of information between frequency agile radios 20. Alternatively or additionally, the second channel communication 22 may allow for secretive transmissions between frequency agile radios 20. The second channel communications 22 may include wireless communications at the certain frequency used by primary transmitter 15. Therefore, the second channel communications 22 may be tailored so as not to affect primary users 18. In other words, frequency agile radios 20 may transmit the second channel communications 22 in accordance with an interference-free transmission characteristic, which may define the boundaries of spectrum hole 23. For example, this interference-free transmission characteristic may include a maximum interference-free transmit power (hereafter "MIFTP").

The interference-free transmission characteristic may be specific to each frequency agile radio 20. For example, at the certain frequency used by primary transmitter 15, frequency agile radio 20a-1 may have a MIFTP of zero watts. But, at the certain frequency used by primary transmitter 15, frequency agile radio 20c-1 may have a MIFTP of greater than zero watts. Communications system 19 may be configured based on the location of primary transmitter 15 and the transmit power of primary transmitter 15 to determine the interference-free transmission characteristic of each frequency agile radio 20. However, since communications site 10 may be unfriendly, as previously discussed, communications system 19 may or may not be able to obtain from primary transmitter 15 the location, frequency and/or transmit power of primary transmitter 15. Therefore, communications system 19 may also be configured to determine the location, frequency and/ or transmit power of primary transmitter 15.

Figure 3:
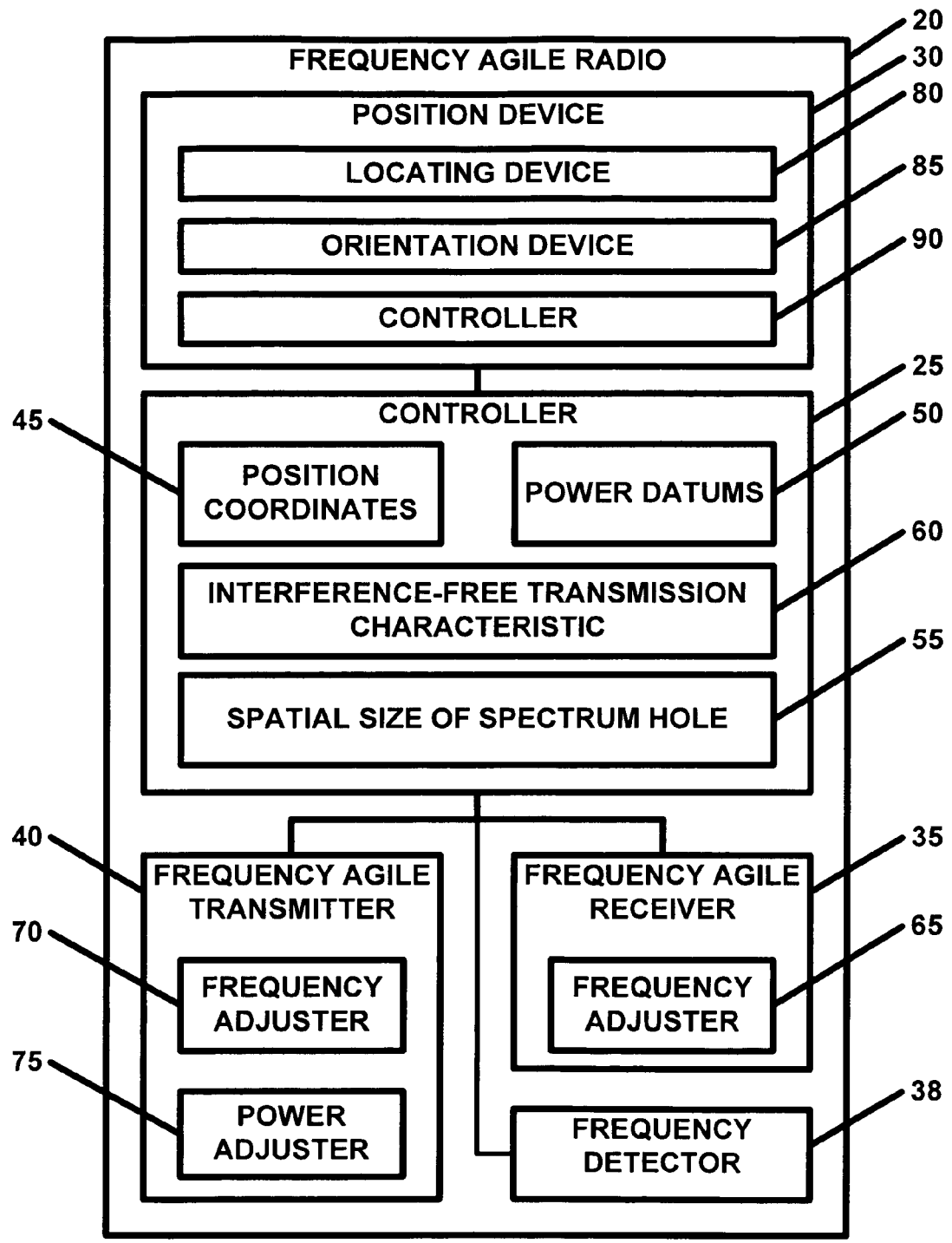
FIG. 3 is a diagrammatic illustration of a frequency agile radio, according to an aspect of an embodiment of the present invention.

Frequency Agile Radio. As illustrated in FIG. 3, each frequency agile radio 20 may include modules such as, for example, a controller 25, a position device 30, a frequency agile receiver 35 and a frequency agile transmitter 40. A module is defined here as an isolatable element that performs a defined function and has a defined interface to other elements. The modules described in this disclosure may be implemented in hardware, software, firmware, wetware (i.e. hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module. In some embodiments, not all frequency agile radios 20 need include any or all of the modules illustrated in FIG. 3. For example, frequency agile radio 20a omit controller 25. Frequency agile radio 20a may alternatively or additionally omit frequency agile transmitter 40. As another example, frequency agile radio 20c may omit frequency agile receiver 35. In some embodiments, modules may be combined. For example, controller 25 and position device 30 may be combined to form a single integral module.

Controller 25 may include, for example, a control module and may monitor, record, store, index, process and/or communicate information. Controller 25 may include, for example, a clock, a memory, one or more data storage devices, a central processing unit and/or another module that may be used to run the disclosed applications. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM. The memory may store, for example, instruction sets, maps, lookup tables, data sets, constants and variables. For example, the memory may store a plurality of position coordinates 45, a plurality of power datums 50, a spatial size 55 of a spectrum hole 23 and an interference-free transmission characteristic 60.

Each position coordinate 45 may include a spatial location and/or an orientation with respect to a coordinate system G (referring to 5 on FIG. 1). Coordinate system G (5) may be fixedly located in communications site 10. Coordinate system G (5) may be a right-handed 2-D Cartesian coordinate system having its origin at a point $O_G$ and having axis vectors $G_x$ and $G_y$. In one embodiment, axis vector $G_x$ may point to magnetic East and axis vector Gy may point to magnetic North. In another embodiment, axis vector $G_x$ may point to true East and axis vector Gy may point to true North. In yet another embodiment, axis vector $G_x$ may point to an arbitrarily determined first direction and axis vector Gy may point to an arbitrarily determined second direction that is orthogonal to the first direction. The spatial location with respect to Coordinate system G (5) may be referenced by its spatial coordinates in the form L=[x,y], where from point $O_G$, X is the distance along axis vector $G_x$ and y is the distance along axis vector $G_y$. The orientation with respect to Coordinate system G (5) may be referenced by its angular coordinates in the form A=[$\alpha$], where rotated about point $O_G$, $\alpha$ is the bearing angle (i.e., the rotation from axis vector $G_x$ about a vector orthogonal to axis vectors $G_x$ and $G_y$).

Each power datum 50 may include a received power at a frequency at one of position coordinates 45 and may be referenced as S. Power datums 50 may be linked to position coordinates 45 to form a data set O. For example, data set O may be referenced in the form O={$(S_i,L_i)$: i=1, ..., N}, where N is the number of power datums and is also the number of position coordinates and $S_i$ is the received power at the frequency at spatial location $L_i$.

Spatial size 55 may include a set of boundaries of spectrum hole 23. In one embodiment, this set of boundaries may take the form of functions and/or points. These functions and/or points may be used by controller 25 to determine interference-free transmission characteristic 60. Interference-free transmission characteristic 60 may include a MIFTP. This MIFTP may be defined as $S_C$.

Position device 30 may determine the spatial location of frequency agile radio 20 and the orientation of frequency agile radio 20 relative to a local reference point, a coordinate system associated with communications site 10, a coordinate system associated with Earth, or another type of fixed 2-D coordinate system. For example, the fixed 2-D coordinate system may include two spatial dimensions. Alternatively, position device 30 may determine the spatial location of frequency agile radio 20 and the orientation of frequency agile radio 20 relative to a fixed 3-D coordinate system. This fixed 3-D coordinate system may include three spatial dimensions. In yet another alternative, position device 30 may determine the spatial location of frequency agile radio 20 and the orientation of frequency agile radio 20 relative to a fixed 4-D coordinate system. This fixed 4-D coordinate system may include three spatial dimensions and a fourth dimension such as a time dimension.

Position device 30 may include a locating device 80 to determine the spatial location of frequency agile radio 20 and an orientation device 85 to determine the orientation of frequency agile radio 20. Position device 30 may also include a controller 90 configured to filter and communicate these determinations to controller 25.

Locating device 80 may receive and analyze high-frequency, low power radio, laser signals, etc., from multiple locations to triangulate a relative spatial location. For example, locating device 80 may include an electronic receiver configured to communicate with one or more satellites, or a local radio or laser transmitting system to determine a relative 2-D spatial location of frequency agile radio 20. Alternatively, locating device 80 may include an Inertial Reference Unit (IRU), odometric or dead-reckoning positioning device, or another known locating device operable to receive or determine a relative 2-D geographical location of frequency agile radio 20. Additionally, assuming that the location of one frequency agile radio 20 is known, exchanged information such as signal strength, time-of-arrival, etc. between frequency agile radios 20 may be used to determine the location of the other frequency agile radios 20. Locating device 80 may communicate the spatial location of frequency agile radio 20 to controller 90, which may filter the spatial location of frequency agile radio 20 into spatial coordinates in coordinate system G 5.

Orientation device 85 may include a radio direction finder, a gyrocompass, a fluxgate compass, or another known device operable to determine a relative bearing of frequency agile radio 20. Orientation device 85 may communicate the information regarding the bearing of frequency agile radio 20 to controller 90, which may filter the information into the rotation of frequency agile radio from axis vector $G_x$ about a vector orthogonal to axis vectors $G_x$ and $G_y$.

Controller 90 may monitor, record, store, index, process and/or communicate information. Controller 90 may include, for example, a memory, one or more data storage devices, a central processing unit and/or another module that may filter information provided by locating device 80 and orientation device 85 and communicate a signal indicative of this filtered information to controller 20. This signal may, for example, include the geographical location of frequency agile radio 20 in spatial coordinates in coordinate system G. The signal may also include the rotation of frequency agile radio 20 from axis vector $G_x$ about a vector orthogonal to axis vectors $G_x$ and $G_y$.

Frequency agile receiver 35 may be able to receive transmissions at varied frequencies. Therefore, frequency agile receiver may include a frequency adjuster 65 to select one of the varied frequencies. In some embodiments, frequency adjuster 65 may include a manually adjustable module such as, for example, a switch, a knob, a dial, or another module for selecting a frequency. Alternatively, frequency adjuster 65 may be automatically controlled via a signal from controller 25. Frequency agile receiver 35 may determine a power of a received transmission at the selected frequency. Frequency agile receiver 35 may generate and communicate to controller 25 a signal representing this determined power of the received transmission at the selected frequency.

Frequency agile transmitter 40 may be able to transmit signals at varied frequencies and powers. Therefore, frequency agile transmitter 40 may include a frequency adjuster 70 and a power adjuster 75. In some embodiments, frequency adjuster 70 may include a manually adjustable module such as, for example, a switch, a knob, a dial, or another module for selecting a frequency. Alternatively, frequency adjuster 70 may be automatically controlled via a signal from a module such as controller 25. In some embodiments, power adjuster 75 may also include a manually adjustable module such as, for example, a switch, a knob, a dial, or another module for selecting a power. Alternatively, power adjuster 75 may be automatically controlled via a signal from controller 25. In response to controller 25, frequency agile transmitter 40 may transmit second channel communications in accordance with interference-free transmission characteristic 60. A spectrum detector 38 may also be used to measure the received signal strength across all frequency channels in the frequency range of interest. These received signal strength measurements may be used to select frequencies to be used by the frequency agile receiver 35 and transmitter 40.

Figure 4:
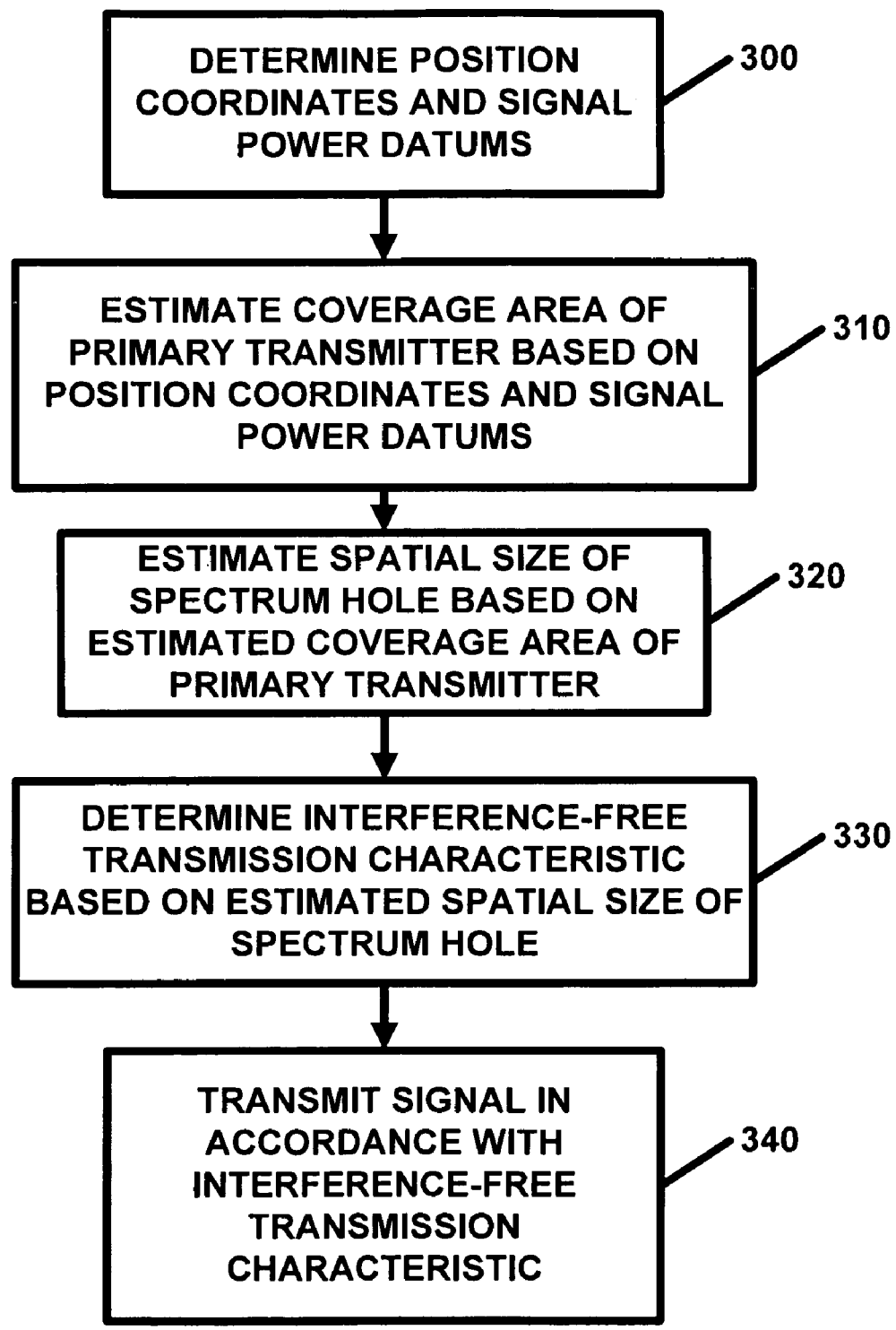
FIG. 4 is a flow chart describing a method of operating a frequency agile radio, according to an aspect of an embodiment of the present invention.

Facilitating Wireless Communications. As illustrated in FIG. 4, the facilitation of wireless communications may include actions 300, 310, 320, 330 and 340, each of which may be applied by controller 25.

Action 300 may include determining position coordinates 45 and signal power datums 50 of frequency agile radios 20a, discussed in detail under heading "Determining Position Coordinates and Signal Power Datums," below. As previously discussed, power datums 50 may be linked to position coordinates 45 to form data set O. For example, referring to FIG. 5, position coordinate 45 of frequency agile radio 20a-1 may be $L_1=[x_1,y_1]$; position coordinate 45 of frequency agile radio 20a-2 may be $L_2=[x_2,y_2]$; and position coordinate 45 of frequency agile radio 20a-3 may be $L_3=[x_3,y_3]$. Power datum 50 at position coordinate $L_1$ may be $S_1$; Power datum 50 at position coordinate $L_2$ may be $S_2$; and Power datum 50 at position coordinate $L_3$ may be $S_3$. Thus, data set O may equal $O=\{(S_i,L_i): i=1,2,3\}$. Action 310 may use data set O to estimate coverage area 17.

Action 310 may include estimating the coverage area of primary transmitter 15 (coverage area 17), discussed in detail under heading "Estimating Coverage Area of Primary Transmitter," below. Coverage area 17 may be defined as an area of communications site 10 within a radius $d_{cov}(p)$ (referring to FIG. 5) of a location of primary transmitter 15. This radius may be related to the transmit power of primary transmitter 15. For example, this relation may be $d_{cov}(p)=g^{-1}(s_p-r_{min}+\sigma_w Q^{-1}(1-\epsilon_{cov}))$, where $g^{-1}()$ may represent the inverse of the path loss component of transmissions of primary transmitter 15; $s_p$ may represent the transmit power of primary transmitter 15; $r_{min}$ may represent a predefined minimum detection threshold on the received power at a location of primary user 18 that will not cause an outage of primary user 18 and may be related to the structure, noise statistics and Quality of Service (QoS) of a receiver of primary user 18; $\sigma_w$ may represent the standard deviation of the shadowing noise; $Q^{-1}()$ may represent the inverse of the standard Q-function; and $\epsilon_{cov}$ may represent a predefined maximum outage probability threshold of primary user 18. The path loss component may depend on the specific propagation condition between primary transmitter 15 and primary user 18. For example, the specific propagation condition may be line-of-sight versus non-line-of-sight, indoor versus outdoor, urban versus rural, etc. The path loss component may include $g(d)=10\epsilon\log_{10}d$, where $\epsilon$ is a constant related to the specific propagation condition and d is the distance between primary transmitter 15 and primary user 18. An outage of primary user 18 may include primary user 18 being unable to receive transmissions of primary transmitter 15. The standard Q-function may include $$Q(x) \triangleq \frac{1}{\sqrt{2\pi}} \int_x^\infty e^{\frac{t^2}{2}} dt.$$

The location of primary transmitter 15 may be $L_p=[x_p,y_p]$. Action 320 may use coverage area 17 to estimate spatial size 55.

Figure 5A:
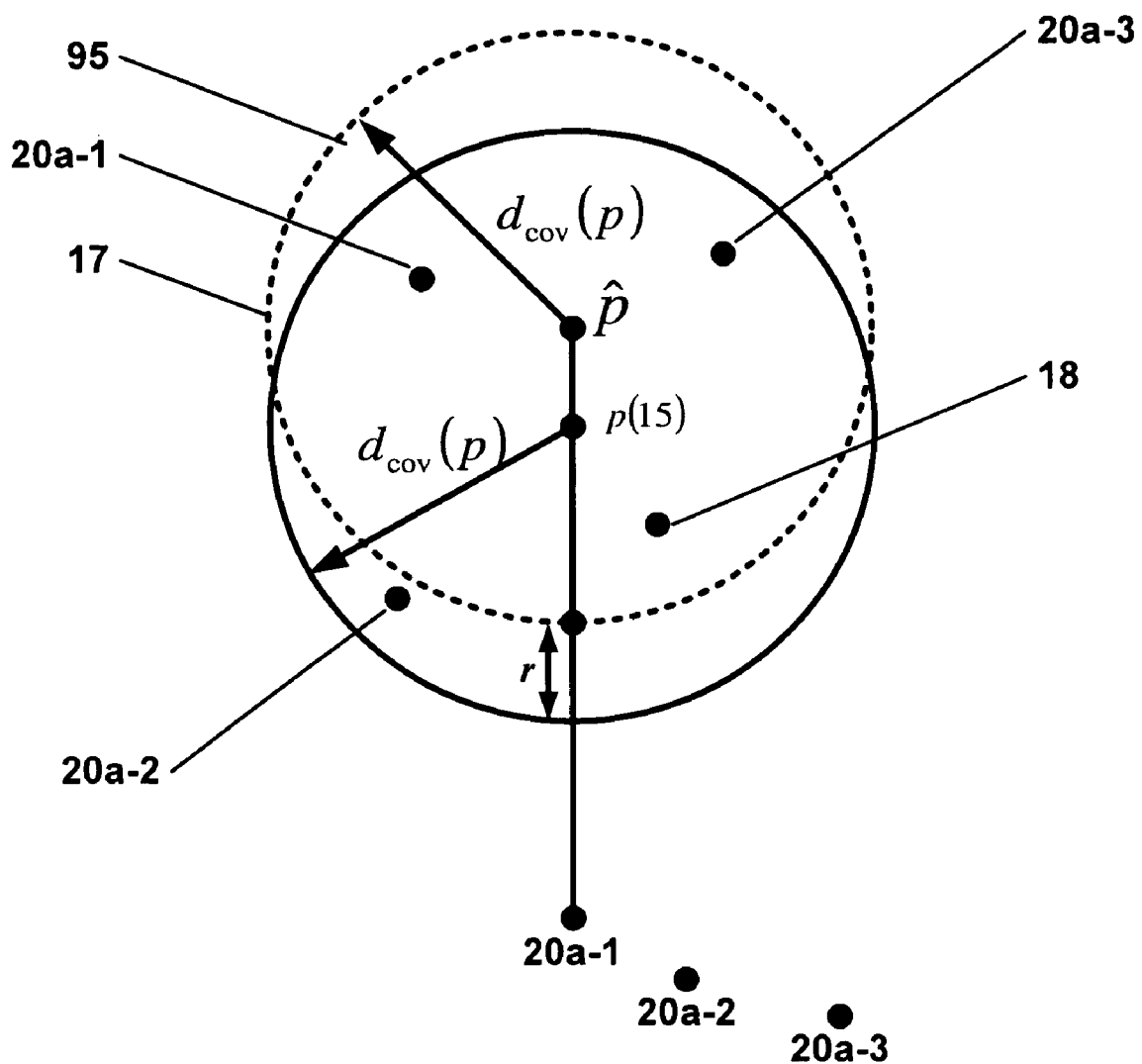
FIG. 5A is a view of the estimated coverage area of the primary transmitter of FIG. 1 when its transmit power is known, according to an aspect of an embodiment of the present invention.
Figure 5B:
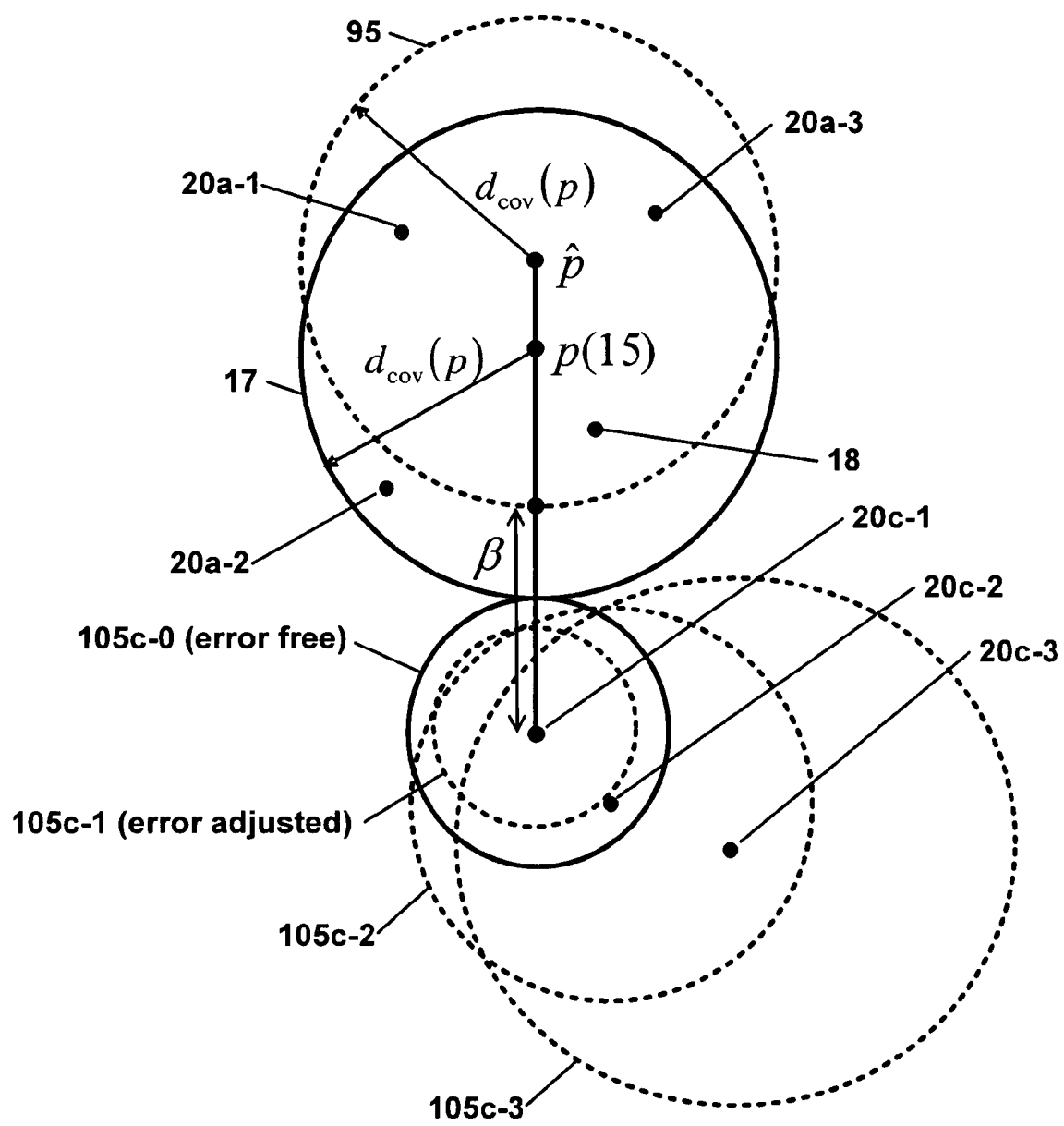
FIG. 5B is a view of the estimated coverage area of the primary transmitter of FIG. 1 when its transmit power is known and omnidirectional interference-free coverage areas of the frequency agile radios of FIG. 1, according to an aspect of an embodiment of the present invention.

Specifically, FIG. 5A shows that for a particular realization, due to error (r) in estimating the location of primary transmitter p, the estimated coverage region (95) may shift towards or away from 20c-1. The figure depicts a worst-case scenario, in the sense that the true location p is closer than the estimated location p-hat and correspondingly the true coverage region is closer to 20c-1 than what is estimated. FIG. 5B shows that the spectrum hole may be characterized in terms of the MIFTP, which depends on beta and its associated CRB. The MIFTP may define a coverage area. For example, circle 105c-1 (error adjusted), is the coverage area of frequency agile radio 20c-1, whereas circle 105c-0 denotes the coverage area of frequency agile radio 20c-1 in the absence of any estimation error.

In some embodiments, action 310 may also include estimating the location of primary transmitter 15 ($L_p$). If $L_p$ is estimated (referring to FIG. 5A), $\epsilon_{\hat{L}_p}$ may be defined as a measure of error in the estimation of $\hat{L}_p$. Action 320 may use the particular realization $\epsilon_{\hat{L}_p}=r$ to estimate spatial size 55.

In some embodiments, action 310 may additionally include estimating $s_p$. If $s_p$ is also estimated, the estimation of $d_{cov}(p)$ may also be associated with an error in estimated $s_p$. $\epsilon_{\hat{s}_p}$ and $\epsilon_{\hat{d}_{cov}(p)}$ may be defined as the measure of error in the estimation of $s_p$ and $d_{cov}(p)$, respectively. Action 320 may use the particular realization $\epsilon_{\hat{L}_p}=r$ and $\epsilon_{\hat{d}_{cov}(p)}=r_0$ (referring to FIG. 6A) to estimate spatial size 55.

Action 320 may include estimating a spatial size of spectrum hole 23 (spatial size 55). As previously discussed, spatial size 55 may include a set of boundaries of spectrum hole 23. In one embodiment, this set of boundaries may take the form of functions and/or points. These functions and/or points may be used by action 330 to determine interference-free transmission characteristic 60.

Action 330 may include determining interference-free transmission characteristic 60 based on spatial size 55, discussed in detail under heading "Determining Interference-Free Transmission Characteristic," below. As previously discussed, interference free transmission characteristic 60 may include a MIFTP, which may be applicable to omnidirectional transmitting frequency agile radios 20c. The MIFTP may define a coverage area 105 (referring to FIG. 5B) for each frequency agile radio 20c. For example, frequency agile radio 20c-1 may have coverage area 105c-1; frequency agile radio 20c-2 may have coverage area 105c-2; and frequency agile radio 20c-2 may have coverage area 105c-3. It should be noted that coverage area 105c-3 is larger than coverage areas 105c-1 and 105c-2 because frequency agile radio 20c-3 is further from primary transmitter 15 than frequency agile radios 20c-1 and 20c-2. The distance between each frequency agile radio 20c and primary transmitter 15 may be defined as $D_{p,c}=\sqrt{(x_p-x_c)^2+(y_p-y_c)^2}$, where the location of frequency agile radio 20c is $L_c$. In other words, the location of frequency agile radio 20c may include spatial coordinates $x_c$ and $y_c$.

Figure 6A:
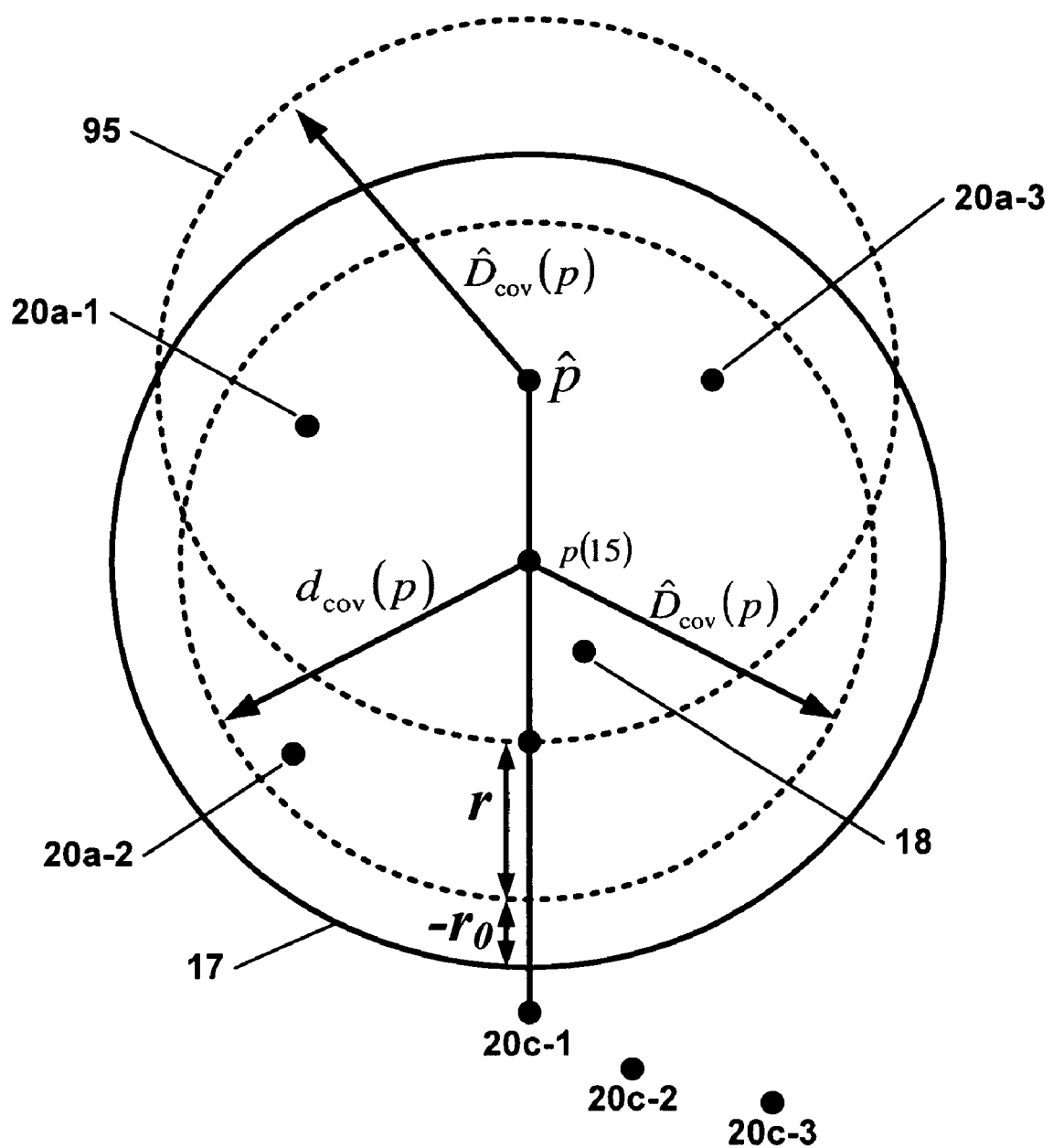
FIG. 6A is a view of the estimated coverage area of the primary transmitter of FIG. 1 when its transmit power is estimated, according to an aspect of an embodiment of the present invention.
Figure 6B:
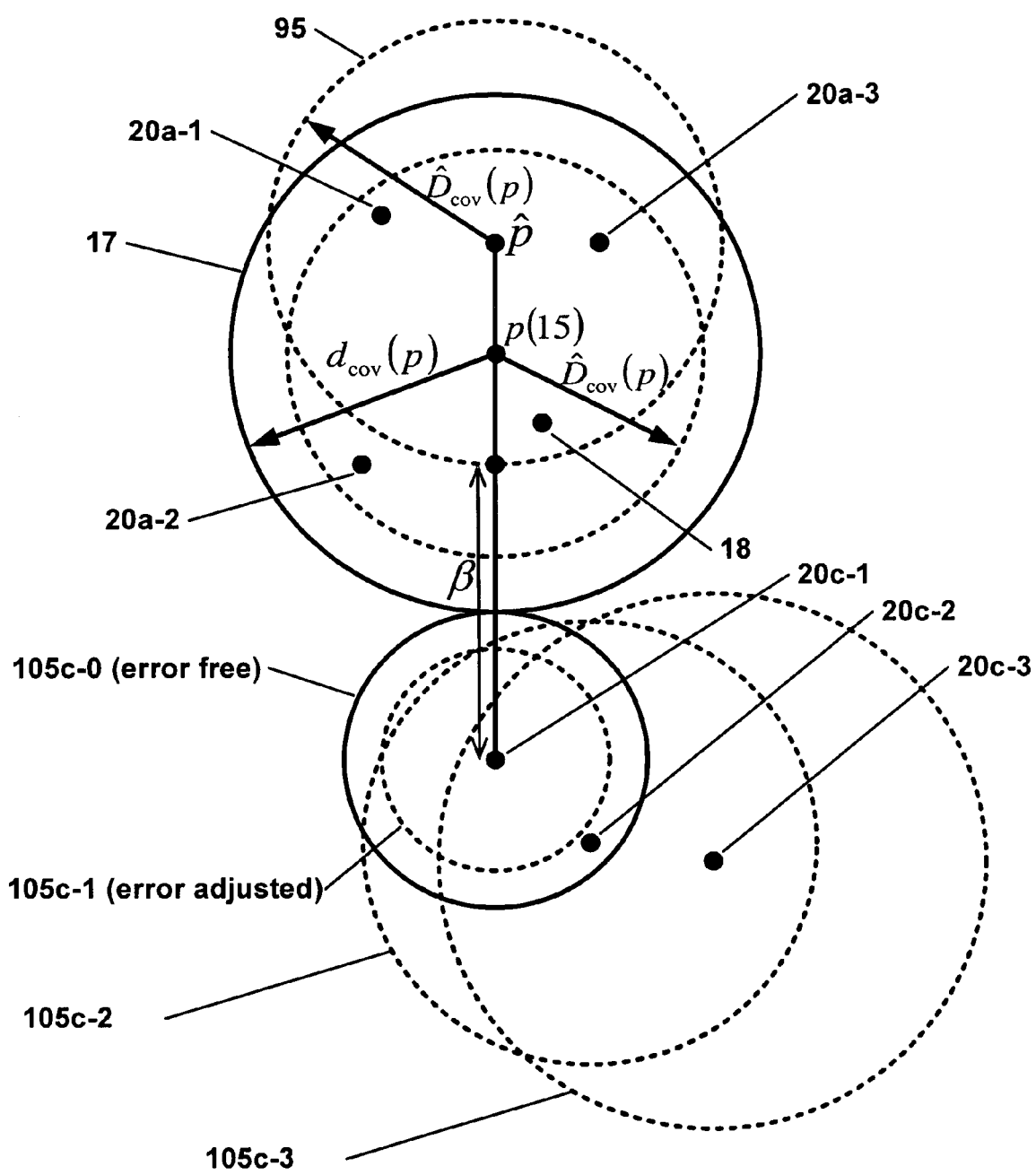
FIG. 6B is a view of the estimated coverage area of the primary transmitter of FIG. 1 when its transmit power is estimated and omnidirectional interference-free coverage areas of the frequency agile radios of FIG. 1, according to an aspect of an embodiment of the present invention.

FIG. 6A is similar to FIG. 5A, but includes estimating $s_p$ and $d_{cov}(p)$. FIG. 6B is similar to FIG. 5B, but includes estimating $s_p$ and $d_{cov}(p)$.

Regardless of whether the interference-free transmission characteristic 60 includes the MIFTP, direction or set of directions, or both the MIFTP and the direction or set of directions, action 340 may use the interference-free transmission characteristic 60 to transmit a signal with second channel communication.

Figure 7:
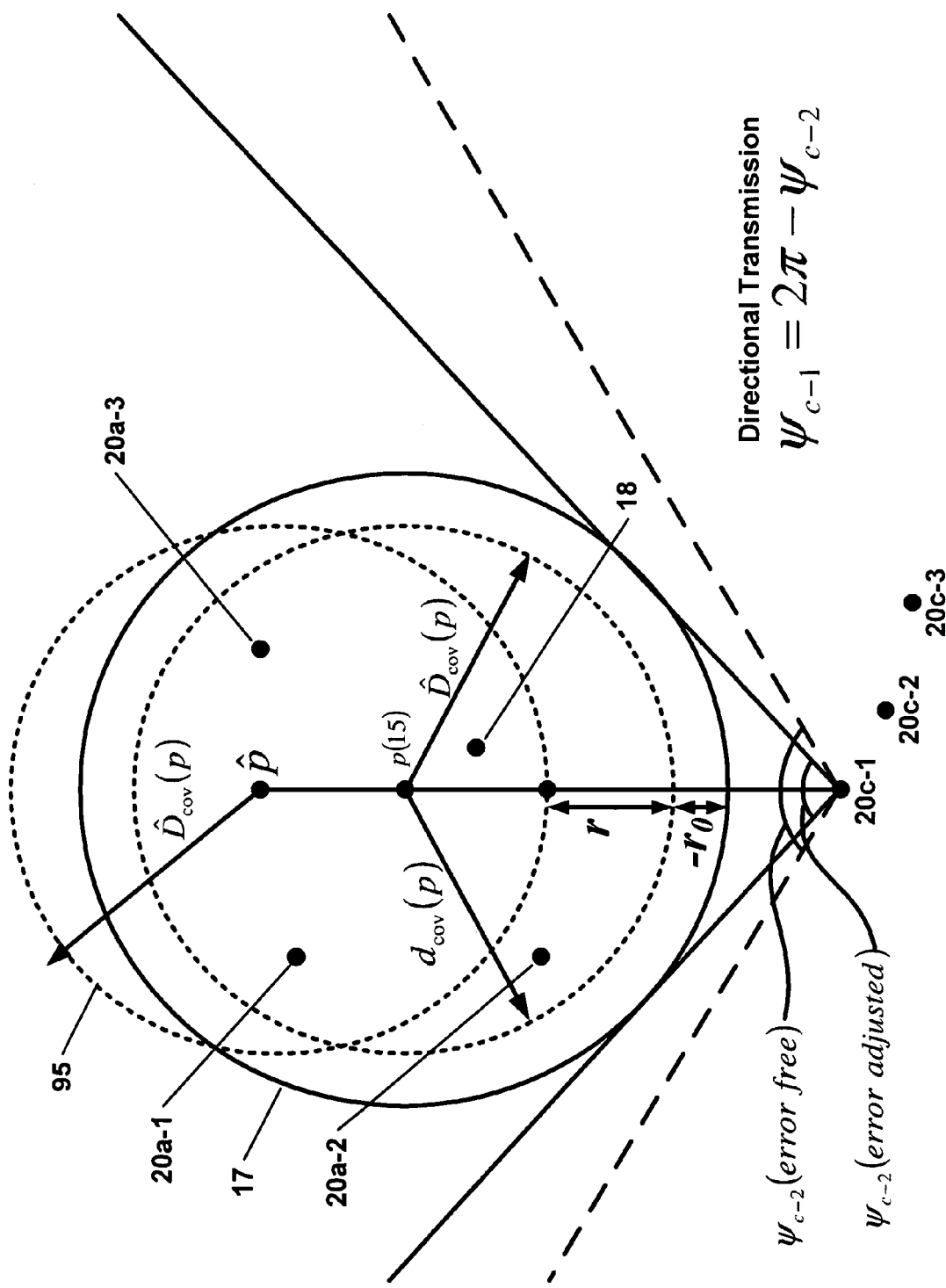
FIG. 7 is a view of a location/power error adjusted coverage area of the primary transmitter of FIG. 1 and directional interference-free coverage areas of the frequency agile radios of FIG. 1, according to an aspect of an embodiment of the present invention.

As illustrated in FIG. 6B, in one embodiment the MIFTP may prevent second channel communications between some frequency agile radios 20c. For example, frequency agile radio 20c-1 may not be able to transmit with second channel communication to frequency agile radio 20c-2 and 20c-3. This is because neither frequency agile radio 20c-2, nor frequency agile radio 20c-3 may be within coverage area 105c-1. In this embodiment, however, frequency agile radios 20c-2 and 20c-3 may transmit with second channel communication to frequency agile radio 20c-1. This is because frequency agile radio 20c-1 may be within both coverage area 105c-2 and 105c-3. It should be noted that if frequency agile radio 20c-1 additionally or alternatively includes set of directions ψc-1, it may be able to transmit with second channel communication to other frequency agile radio 20c. This is because, as illustrated in FIG. 7, all of the frequency agile radios 20c may be within set of directions ψc-1 of frequency agile radio 20c-1.

Action 340 may use the interference-free transmission characteristic 60 to transmit a signal with second channel communication. As illustrated in FIG. 6B, in one embodiment the MIFTP may prevent second channel communications between some frequency agile radios 20c. For example, frequency agile radio 20c-1 may not be able to transmit with second channel communication to frequency agile radio 20c-2 and 20c-3. This is because neither frequency agile radio 20c-2, nor frequency agile radio 20c-3 may be within coverage area 105c-1. In this embodiment, however, frequency agile radios 20c-2 and 20c-3 may transmit with second channel communication to frequency agile radio 20c-1. This is because frequency agile radio 20c-1 may be within both coverage area 105c-2 and 105c-3.

Determining Position Coordinates and Signal Power Datums. As previously discussed, action 300 may include determining position coordinates and signal power datums. Specifically, each frequency agile radio 20 may triage the varied frequencies until finding a frequency at which only zero power or low power transmissions may be received (hereafter the "low power frequency"). For example, one of frequency agile radios 20c (hereafter "frequency agile radio 20c") may find the low power frequency. If frequency agile radio 20c finds the low power frequency, frequency agile radio 20c may determine a power at the low power frequency (hereafter a "signal power datum") at a position of frequency agile radio 20c. Frequency agile radio 20c may store in its memory for later use both the determined signal power datum and the position at which the determination took place (i.e., the position coordinates of frequency agile radio 20c).

In some embodiments, the determinations of action 300 may include using first channel communication. Specifically, frequency agile radio 20c may, using first channel communication, transmit the low power frequency to each other frequency agile radio 20 within communications site 10. As previously discussed, the first channel communication may include low bandwidth communication. In one embodiment, one frequency agile radio 20a (hereafter "frequency agile radio 20a") may receive the first channel communication from frequency agile radio 20c. Frequency agile radio 20a may determine a signal power datum at a position of frequency agile radio 20a. This determined signal power datum may be high because the low power frequency may be the certain frequency used by primary transmitter 15. Frequency agile radio 20a may, using the first channel communication, transmit to frequency agile radio 20c the determined signal power datum and the position of frequency agile radio 20a. Frequency agile radio 20c may receive the first channel communication from frequency agile radio 20a. In some embodiments, frequency agile 20c may receive similar first channel communications from other frequency agile radios 20a. These similar first channel communications may include signal power datums as determined by other frequency agile radios 20a and the respective positions of other frequency agile radios 20a. For each received first channel communication from frequency agile radio 20a, frequency agile radio 20c may store in its memory for use by other actions both the determined signal power datum and the position at which the determination took place (i.e., the position coordinates of frequency agile radio 20a). Specifically, this storage may be in the form of data set O.

Alternatively, the determinations of action 300 may omit first channel communications. Specifically, frequency agile radio 20c may be moved one or more times to other positions. At each of these other positions, frequency agile radio 20c may again determine a signal power datum. Frequency agile radio 20c may also again store in its memory for use by other actions both the determined signal power datum and the position at which the determination took place (i.e., the position coordinates of frequency agile radio 20c). Specifically, this storage may be in the form of data set O.

In another alternative, the determinations of action 300 may omit frequency agile radio 20c finding the low power frequency. Instead, the low power frequency may be selected by an operator of any one of frequency agile radios 20 (hereafter "frequency agile radio 20"). Frequency agile radio 20 may, using first channel communication, transmit the low power frequency to each other frequency agile radio 20 within communications site 10. In one embodiment, frequency agile radio 20a may receive the first channel communication from frequency agile radio 20. Frequency agile radio 20a may determine a signal power datum at a position of frequency agile radio 20a. This determined signal power datum may be high because the low power frequency may be the certain frequency used by primary transmitter 15. Frequency agile radio 20a may, using the first channel communication, transmit to frequency agile radio 20c the determined signal power datum and the position of frequency agile radio 20a. In one embodiment, frequency agile radio 20c may receive the first channel communication from frequency agile radio 20a. In some embodiments, frequency agile 20c may receive similar first channel communications from other frequency agile radios 20a. These similar first channel communications may include signal power datums as determined by other frequency agile radios 20a and the respective positions of other frequency agile radios 20a. For each received first channel communication from frequency agile radio 20a, frequency agile radio 20c may store in its memory for use during other actions both the determined signal power datum and the position at which the determination took place (i.e., the position coordinates of frequency agile radio 20a). Specifically, this storage may be in the form of data set O.

Estimating Coverage Area of Primary Transmitter. Based on the stored position coordinates and signal power datums (set O), frequency agile radio 20c may estimate the coverage area of primary transmitter 15 (action 310). In one embodiment, the estimation of action 310 may also be based on the transmit power of primary transmitter 15 (referring to FIG. 8). Alternatively, the estimation of action 310 need not be based on the transmit power of transmitter 15 (referring to FIG. 9).

Figure 8:
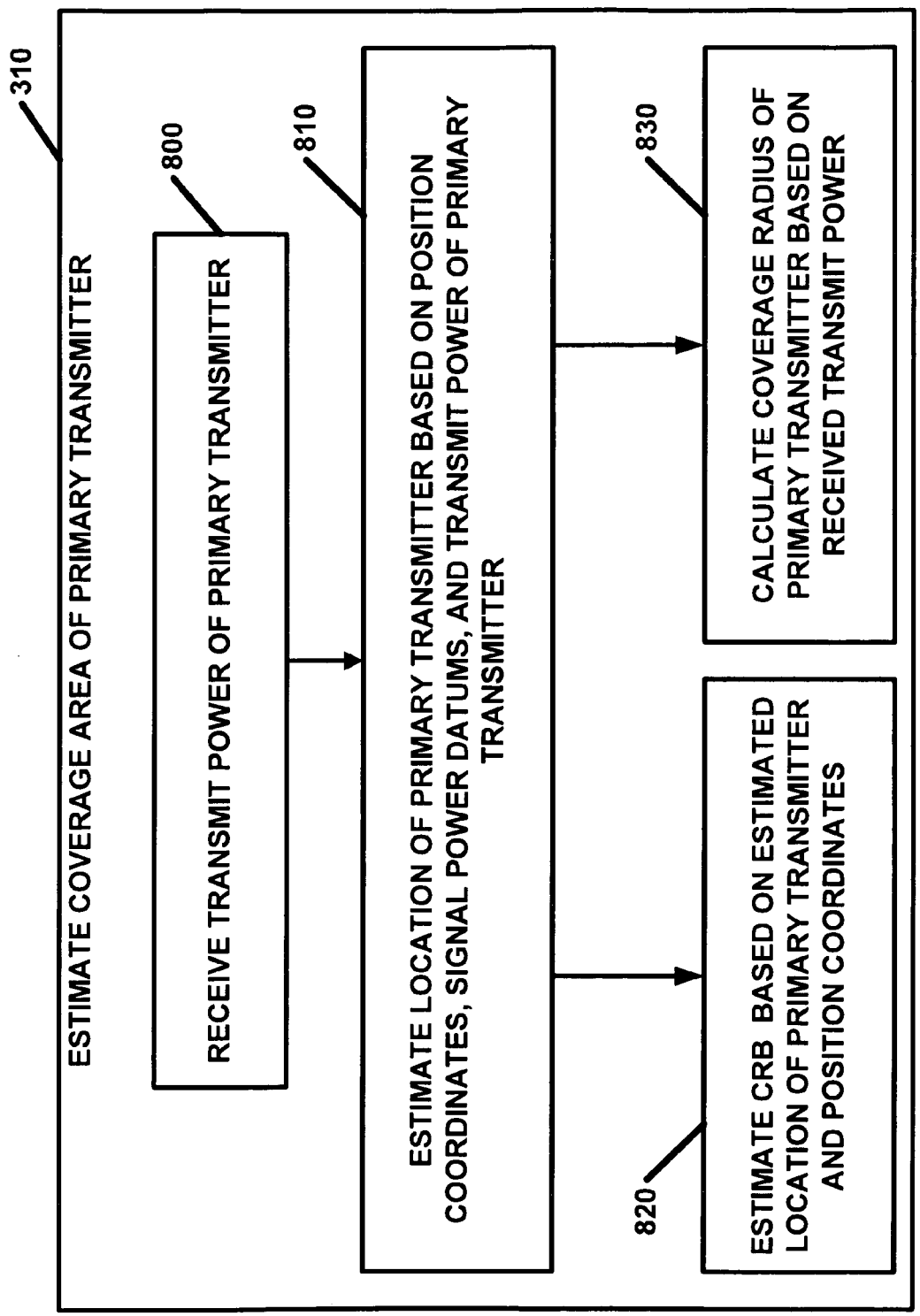
FIG. 8 is a flow chart describing a method of estimating a primary transmitter's coverage area when its transmit power is known, according to an aspect of an embodiment of the present invention.

Estimating Coverage Area of Primary Transmitter Based on a Transmit Power of the Primary Transmitter Obtained from the Primary Transmitter. As illustrated in FIG. 8, action 310 may include receiving the transmit power of primary transmitter 15 (action 800). Action 310 may also include estimating the location of primary transmitter 15 (action 810). In addition, action 310 may include estimating the coverage radius of primary transmitter 15 (action 830).

The receiving of action 800 may include a selection of an operator of one of frequency agile radios 20. In one embodiment, this operator may know the transmit power of primary transmitter 15. Alternatively, the operator may estimate the transmit power of primary transmitter 15. For example, the operator may know that transmitters similar in size to transmitter 15 are capable of transmitting at a certain transmit power. The operator may interface with frequency agile radio 20 to select this certain transmit power ($s_p$), which may be used by actions 810, 820 and 830.

The estimating of the location of primary transmitter 15 of action 810 may be based on data set O. As previously discussed, data set O may include the determined signal power datums at determined position coordinates. The estimating of action 810 may also be based on the transmit power of primary transmitter 15. Specifically, the estimating of the location of primary transmitter 15 may include calculating a maximum likelihood estimation of the location of primary transmitter 15. This calculation may be performed by solving the formula $$\hat{L}_p = \arg\max_L f_{S|L}.$$

$$\hat{L}_p = \arg\max_L f_{S|L}$$

may be solved using a sequential quadratic programming method. Sequential quadratic programming methods are well known in the art. As an initial location estimate, a mid-point of a rectangle which circumscribes all circles with radius $d_i$ centered at $(x_i, y_i)$, may be used. Each $d_i$ may represent the distance between primary transmitter 15 and one datum of data set O. For example, $d_i$ may be defined as $d_i = \sqrt{(x_p - x_i)^2 + (y_p - y_i)^2}$, where i corresponds to one datum of data set O. Each tuple $(x_i, y_i)$ may represent the location of the frequency agile radio where the i-th signal strength measurement is made. Since the transmit power of the primary transmitter is obtained, the distance maximum likelihood estimate $\hat{d}_i$ can be determined in closed-form for each signal strength measurement. Particularly, $\hat{d}_i$ can be calculated by implementing the formula $$\hat{d}_i = 10^{\frac{s_p - s_i}{10\varepsilon}},$$

where $s_p$ is the transmit power of the primary transmitter, $S_i$ is the signal strength measurement and $\epsilon$ is a constant related to the specific propagation condition of transmissions of transmitter 15.

$f_{S|L}$ may denote a likelihood function conditioned on $L_p$. The likelihood function may relate the power received by each frequency agile radio 20 and the location of each frequency agile radio 20 to the location of primary transmitter 15. In particular, the likelihood function may be defined as $$f_{S|L}(S) = \frac{1}{(2\pi)^{\frac{N}{2}}|\Lambda|^{\frac{1}{2}}} \exp\left\{-\frac{1}{2}(S-z)^T \Lambda^{-1}(S-z)\right\},$$

and may account for path loss and shadowing noise. S may include a vector including each $S_i$ from data set O. L may include a vector including each $L_i$ from data set O. N may be the number of datums of data set O. $\Lambda$ may be defined as $\Lambda = \sigma_w^2 I$, where $\sigma_w$ represents the standard deviation of the shadowing noise and I may be defined as the N by N identity matrix. $|\Lambda|$ denotes the determinant of $\Lambda$. z may include a vector including one $z_i$ for each datum of data set O. Each $z_i$ may be defined as $z_i = s_p - g(d_i)$, where $g(d_i) = 10\epsilon \log_{10} d_i$ and represents path loss. $\epsilon$ is a constant related to the specific propagation condition of transmissions of transmitter 15.

The estimate of the location of primary transmitter $\hat{L}_p$ may be associated with an error measure. Specifically, this measure may be the estimate of a Cramer-Rao bound (hereafter "CRB"), which gives a lower bound on the mean squared error of $\hat{L}_p$ (action 820). The CRB of the estimate $\hat{L}_p$ of $L_p$ may be given by $J_{L_p}^{-1}$, where $E_{L_p}[(\hat{L}-L)(\hat{L}-L)^T] \geq J_{L_p}^{-1}$. $E_{L_p}[\ ]$ denotes a conditional expectation with respect to $L_p$ and $J_{L_p}$ may be a Fisher information matrix (hereafter "FIM"). The inequality should be interpreted as the assertion that $E_{L_p}[(\hat{L}-L)(\hat{L}-L)^T] - J_{L_p}^{-1}$ is non-negative definite. The FIM can be expressed as $$J_{L_p} = \left(\frac{10\varepsilon}{\sigma_w \ln 10}\right)^2 HD^2 H^T.$$

$\sigma_w$ represents the standard deviation of the shadowing noise and $\epsilon$ is a constant related to the specific propagation condition of transmissions of transmitter 15. H may be defined as $$H = \begin{bmatrix} \cos\phi_1 & \cos\phi_2 & \ldots & \cos\phi_N \\ \sin\phi_1 & \sin\phi_2 & \ldots & \sin\phi_N \end{bmatrix},$$

where each column of matrix H corresponds to one datum of data set O and N may be the number of datums of data set O. D may be defined as $D = \text{diag}[d_1^{-1}, \ldots, d_N^{-1}]$, where diag[ ] denotes a diagonal matrix. $\phi_i$ may be defined as $$\phi_i = \tan^{-1}\left(\frac{y_p - y_i}{x_p - x_i}\right); i = 1, \ldots, N,$$

where $\phi_i$ represents the angle between axis vector $G_x$ and the line connecting $L_p$ and $L_i$.

Calculating the coverage radius of primary transmitter 15 of action 830 may be based on the transmit power of transmitter 15. Specifically, computing the coverage radius may include implementing the formula $d_{cov}(p) = g^{-1}(s_p - r_{min} + \sigma_w Q^{-1}(1-\epsilon_{cov}))$, where $g^{-1}(\ )$ represents the inverse of the path loss component of transmissions of primary transmitter 15, $s_p$ represents the power of transmissions of primary transmitter 15, $r_{min}$ represents a predefined minimum detection threshold on the received power at a location of primary user 18 that will not cause an outage of primary user 18, $\sigma_w$ represents the standard deviation of the shadowing noise, $Q^{-1}(\ )$ represents the inverse of the standard Q-function and $\epsilon_{cov}$ represents a predefined maximum outage probability threshold of primary user 18. Coverage area 17 may include an area of communications site 10 within a radius of $d_{cov}(p)$ of the circle with radius $\epsilon_{\hat{L}_p}$ centered at $\hat{L}_p$.

Figure 9:
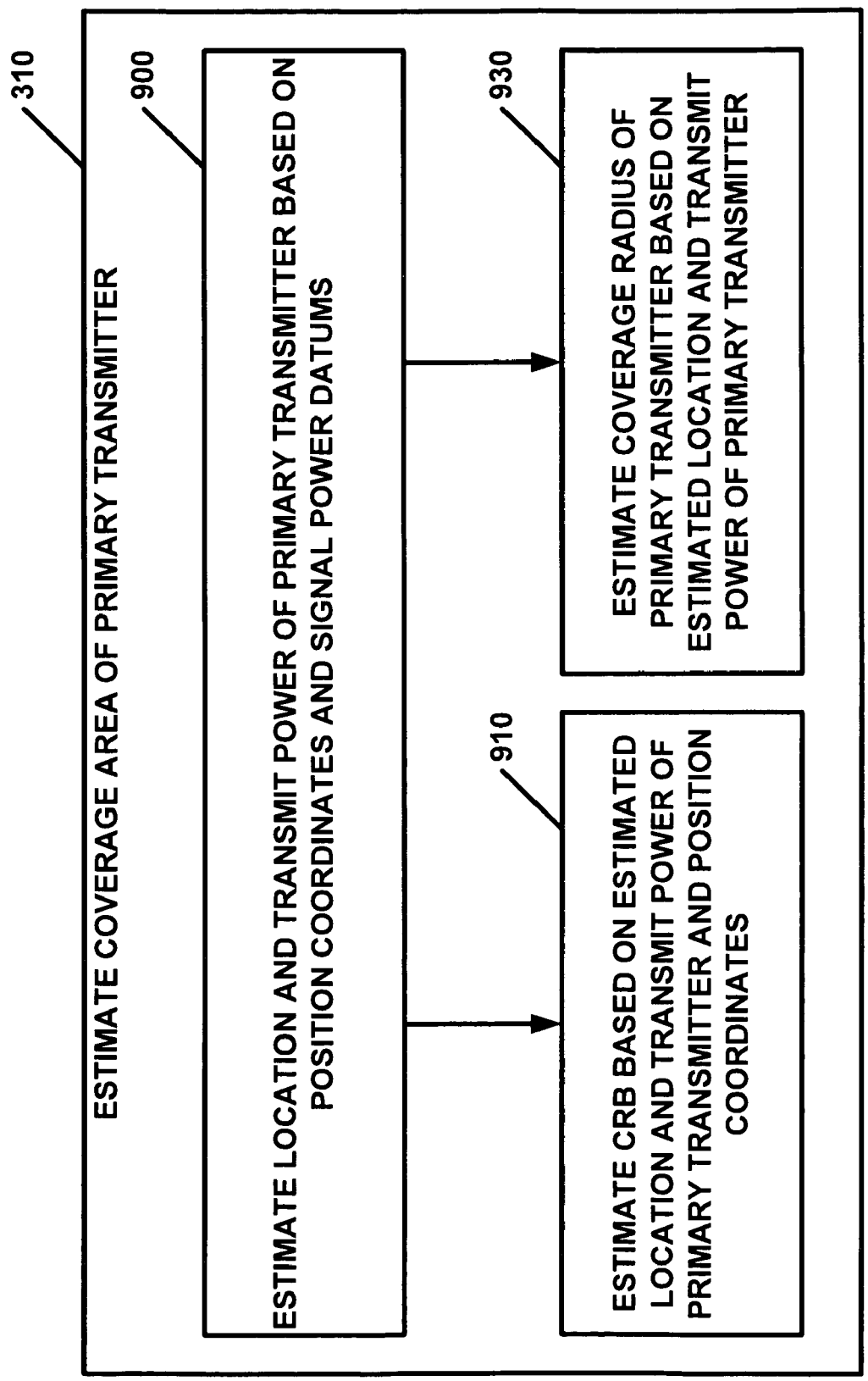
FIG. 9 is a flow chart describing a method of estimating a primary transmitter's coverage area when its transmit power is estimated, according to an aspect of an embodiment of the present invention.

Estimating Coverage Area of Primary Transmitter Not Based on a Transmit Power of the Primary Transmitter Obtained from the Primary Transmitter. As illustrated in FIG. 9, action 310 may include estimating the location and transmit power of primary transmitter 15 (action 900). Action 310 may also include estimating the CRB corresponding to the estimates of location and transmit power of primary transmitter (action 910). In addition, action 310 may include estimating the coverage area of primary transmitter 15 (action 930).

The estimating of the location and transmit power of primary transmitter 15 of action 900 may be based on data set O. As previously discussed, data set O may include the determined signal power datums at determined position coordinates. Specifically, the estimating of the location of primary transmitter 15 may include calculating a maximum likelihood estimator of a combination of the location of primary transmitter 15 and the transmission power of primary transmitter 15. Similar to the definition of L, $\hat{\Theta}$ may be defined as $\hat{\Theta} = [x, y, s]$. Therefore, $\hat{\Theta}_p$ may include both $\hat{L}_p$ and $\hat{s}_p$. The calculation may be performed by solving the formula $$\hat{\Theta}_p = \underset{\Theta}{\operatorname{argmax}}\, f_{S|\Theta}.$$

$$\hat{\Theta}_p = \underset{\Theta}{\operatorname{argmax}}\, f_{S|\Theta}$$

may be solved using a sequential quadratic programming method. Sequential quadratic programming methods are well known in the art. The initial power estimate is taken as the mid point of the range of possible transmit power values, which may be determined using a priori information about the primary network. In other words, the initial transmit power estimate is $$s_{initial} = \frac{s_{max} + s_{min}}{2},$$

where $s_{max}$ and $s_{max}$ denote the maximum and minimum values of the possible power range, respectively. As an initial location estimate, a mid-point of a rectangle which circumscribes all circles with radius $D_0$ centered at $(x_i, y_i)$, may be used. Each tuple $(x_i, y_i)$ may represent the location of the frequency agile radio where the i-th signal strength measurement is made. Particularly, $D_0$ can be calculated by implementing the formula $$D_0 = 10^{\frac{s_{max} - S_i}{10\varepsilon}},$$

where $S_i$ is the signal strength measurement and $\epsilon$ is a constant related to the specific propagation condition of transmissions of transmitter 15.

$f_{S|\Theta}$ may denote a likelihood function conditioned on $\Theta_p$. The likelihood function may relate the power received by each frequency agile radio 20 and the location of each frequency agile radio 20 to the location of primary transmitter 15 and the transmission power of primary transmitter 15. In particular, the likelihood function may be defined as $$f_{S|\Theta}(S) = \frac{1}{(2\pi)^{\frac{N}{2}}|\Lambda|^{\frac{1}{2}}} \exp\left\{-\frac{1}{2}(S-z)^T \Lambda^{-1}(S-z)\right\}.$$

S may include a vector including each $S_i$ from data set O. L may include a vector including each $L_i$ from data set O. N may be the number of datums of data set O. $\Lambda$ may be defined as $\Lambda = \sigma_w^2 I$, where $\sigma_w$ represents represents the standard deviation of the shadowing noise and I may be defined as the N by N identity matrix. $|\Lambda|$ denotes the determinant of $\Lambda$. z may include a vector including one $z_i$ for each datum of data set O. Each $z_i$ may be defined as $z_i = s_p - g(d_i)$, where $g(d_i) = 10\epsilon \log_{10} d_i$ and represents path loss. $\epsilon$ is a constant related to the specific propagation condition of transmissions of transmitter 15.

The estimate of the location $\hat{L}_p$ and transmit power $\hat{s}_p$ of primary transmitter may be associated with an error measure. Specifically, this measure may be given by the estimate of the CRB (action 910). The CRB of the estimate $\hat{\Theta}_p$ of $\Theta_p$ may be given by $J_{\Theta_p}^{-1}$, where $E_{\Theta_p}[(\hat{\Theta}_p - \Theta_p)(\hat{\Theta}_p - \Theta_p)^T] \geq J_{\Theta_p}^{-1}$. $E_{\Theta_p}[\ ]$ denotes a conditional expectation with respect to $\hat{\Theta}_p$ and $J_{\Theta_p}$ may be a FIM. The inequality should be interpreted as the assertion that $E_{\Theta_p}[(\hat{\Theta}_p - \Theta_p)(\hat{\Theta}_p - \Theta_p)^T] - J_{\Theta_p}^{-1}$ is non-negative definite. The FIM can be expressed as $$J_{\Theta_p} = \frac{1}{\sigma_w^2} B G D^2 G^T B.$$

$\sigma_w$ represents the standard deviation of the shadowing noise and D may be defined as $D = \text{diag}[d_1^{-1}, \ldots, d_N^{-1}]$, where $\text{diag}[\ ]$ denotes a diagonal matrix. B may be defined as $$B = \text{diag}\left[\frac{-10\varepsilon}{\ln 10}, \frac{-10\varepsilon}{\ln 10}, 1\right],$$

where $\epsilon$ is a constant related to the specific propagation condition of transmissions of transmitter 15. G may be defined as $$G = \begin{bmatrix} \cos\phi_1 & \ldots & \cos\phi_N \\ \sin\phi_1 & \ldots & \sin\phi_N \\ d_1 & \ldots & d_N \end{bmatrix},$$

where each column of matrix G corresponds to one datum of data set O. $\phi_i$ may be defined as $$\phi_i = \tan^{-1}\left(\frac{y_p - y_i}{x_p - x_i}\right),$$

where $\phi_i$ represents the angle between axis vector $G_x$ and the line connecting $L_p$ and $L_i$ and i corresponds to one datum of data set O. $d_i$ may be defined as $d_i = \sqrt{(x_p - x_i)^2 + (y_p - y_i)^2}$, where i corresponds to one datum of data set O. N may be the number of datums of data set O. $J_{\Theta_p}^{-1}$ can be expressed as $$J_{\Theta_p}^{-1} = \begin{bmatrix} J_{L_p}^{-1} + b^{-1}cc^T & -b^{-1}c \\ -b^{-1}c^T & b^{-1} \end{bmatrix}, \text{ where } J_{L_p} = \left(\frac{10\varepsilon}{\sigma_w \ln 10}\right)^2 HD^2 H^T.$$

b may be defined as $$b = \frac{N}{\sigma_w^2} - a^T J_{L_p}^{-1} a$$

and c may be defined as $c = J_{L_p}^{-1} a$, where a may be defined as $$a = -\frac{10\varepsilon}{\sigma_w^2 \ln 10}\left[\sum_{i=1}^{N} \frac{\cos\phi_i}{d_i} \quad \sum_{i=1}^{N} \frac{\sin\phi_i}{d_i}\right]^T.$$

The estimating of the coverage radius of primary transmitter 15 of action 930 may be based on the estimated transmit power of transmitter 15. Specifically, the estimating of coverage radius may include estimating $d_{cov}(p)$. Estimating $d_{cov}(p)$ may include implementing the formula $\hat{D}_{cov}(p) = g^{-1}(\hat{s}_p - r_{min} + \sigma_w Q^{-1}(1 - \epsilon_{cov}))$, where $g^{-1}(\ )$ represents the inverse of the path loss component of transmissions of primary transmitter 15, $r_{min}$ represents a predefined minimum detection threshold transmission power at a location of primary user 18 that will not cause an outage of primary user 18, $\sigma_w$ represents the standard deviation of the shadowing noise, $Q^{-1}(\ )$ represents the inverse of the standard Q-function and $\epsilon_{cov}$ represents a predefined maximum outage probability threshold of primary user 18 and $\hat{s}_p$ is the estimate of the transmit power of the primary transmitter 15 calculated in action 900.

Determining Interference-Free Transmission Characteristic. Based on the spatial size 55 and a location of frequency agile radio 20, frequency agile radio 20c may determine interference-free transmission characteristic 60 (action 310). In one embodiment, interference-free transmission characteristic 60 may include the MIFTP ($s_c$) (referring to FIG. 10).

Figure 10:
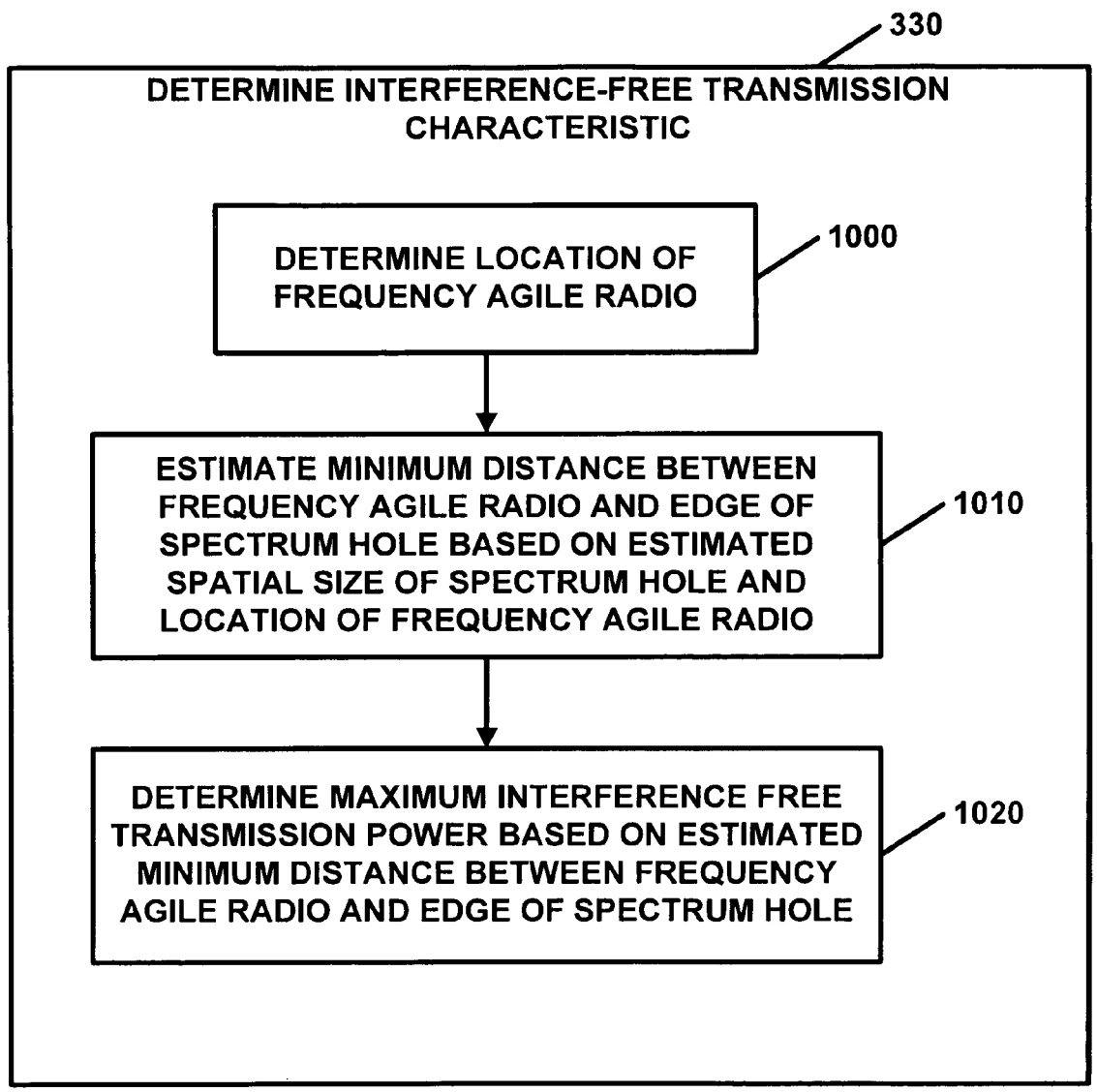
FIG. 10 is a flow chart describing a method of determining an interference-free transmission characteristic of a frequency agile radio omnidirectional interference-free coverage area, according to an aspect of an embodiment of the present invention.

As illustrated in FIG. 10, action 330 may include determining the location of frequency agile radio 20c (action 1000). Action 330 may also include estimating a minimum distance between frequency agile radio 20c and an edge of spectrum hole 23 (action 1010). Additionally, action 330 may include determining the MIFTP (action 1020).

The determining of action 1000 may include receiving from positioning device 30 the location of frequency agile radio 20c (hereafter "$L_c$").

The estimating of the minimum distance between frequency agile radio 20c and the edge of spectrum hole 23 (hereafter "$\beta$") of action 1010 may be based on spatial size 55 and $L_c$. As previously discussed, spatial size 55 may define the boundaries of spectrum hole 23 and may be equivalent to the boundaries of coverage area 17. Specifically, the estimating of $\beta$ may include implementing the formula $\beta = \hat{D}_{p,c} - d_{cov}(p)$, where $D_{p,c} = \sqrt{(\hat{x}_p - x_c)^2 + (\hat{y}_p - y_c)^2}$ and $d_{cov}(p) = g^{-1}(s_p - r_{min} + \sigma_w Q^{-1}(1 - \epsilon_{cov}))$, if the transmit power of the primary transmitter is obtained. Here $(\hat{x}_p, \hat{y}_p)$ denote the location estimate of the primary transmitter. If the transmit power of the primary transmitter is estimated as $\hat{s}_p$, then the estimating of $\beta$ may include implementing the formula $\beta = \hat{D}_{p,c} - \hat{d}_{cov}(p)$, where $\hat{D}_{p,c} = \sqrt{(\hat{x}_p - \hat{x}_c)^2 + (\hat{y}_p - y_c)^2}$ and $\hat{D}_{cov}(p) = g^{-1}(\hat{s}_p - r_{min} + \sigma_w Q^{-1}(1 - \epsilon_{cov}))$.

The determining of the MIFTP ($s_a$) of action 1020 may be based on $\beta$ and may differ depending on whether the transmit power of primary transmitter 15 is obtained from primary transmitter 15. Specifically and when the transmit power of transmitter 15 is obtained from primary transmitter 15, the determining of $s_a$ may include the formula $$s_a = \begin{cases} i_{max} + 10\varepsilon\log_{10}\beta - \sigma_w\sqrt{1 + \left(\frac{50\varepsilon}{\beta\sigma_w \ln 10}\right)^2 \hat{J}_{D_{p,c}}^{-1}} \ Q^{-1}(\varepsilon_{cov}), & \text{if } \beta > \hat{\beta}^* > 0 \\ 0, & \text{otherwise,} \end{cases}$$

where $\epsilon$ is a constant related to the specific propagation condition of transmissions of transmitter 15, $\sigma_w$ represents the standard deviation of the shadowing noise, $\epsilon_{cov}$ represents a predefined maximum outage probability threshold of primary user 18 and $i_{max}$ is a predefined interference threshold. $\hat{J}_{D_{p,c}}^{-1}$ may be defined as the estimate of $J_{D_{p,c}}^{-1}$, which may be equivalent to the CRB of $D_{p,c}$. $\hat{\beta}^*$ may be defined as $$\hat{\beta}^* = \sqrt{J_{D_{p,c}}^{-1}} \ Q^{-1}\left(\frac{1-k}{2}\right),$$

where k is a predefined constant set between 0 and 1. For example, if k=0.9973, $\hat{\beta}^* \approx 3\sqrt{J_{D_{p,c}}^{-1}}$....

When the transmit power of transmitter 15 is not obtained from primary transmitter 15, the determining of $s_a$ may include the formula $$s_a = \begin{cases} i_{max} + 10\varepsilon\log_{10}\beta - \sigma_w\sqrt{1 + \left(\frac{50\varepsilon}{\beta\sigma_w \ln 10}\right)^2 \hat{J}_1^{-1}} \ Q^{-1}(\varepsilon_{cov}), & \text{if } \beta > \hat{\beta}^* > 0 \\ 0, & \text{otherwise,} \end{cases}$$

where $\epsilon$ is a constant related to the specific propagation condition of transmissions of transmitter 15, $\sigma_w$ represents the standard deviation of the shadowing noise, $\epsilon_{cov}$ represents a predefined maximum outage probability threshold of primary user 18 and $i_{max}$ is a predefined interference threshold. $\hat{J}_1^{-1}$ may be defined as $\hat{J}_1^{-1} = Tr(J_{\tilde{\Theta}}^{-1}) - 2\lfloor J_{\tilde{\Theta}}^{-1} \rfloor_{(1,2)}$. $J_{\tilde{\Theta}}^{-1}$ may be the CRB of $\tilde{\Theta}$, which may be defined as $\tilde{\Theta} = [D_{p,a} \ d_{cov}(p)]^T$. $\hat{B}^*$ may be defined as $$\hat{B}^* = \sqrt{\hat{J}_1^{-1}} \ Q^{-1}\left(\frac{1-\varepsilon}{2}\right),$$

where k is a predefined constant set between 0 and 1.

Interference-free Transmission Characteristic 60 including Direction or Set of Directions. This module may be implemented using antenna arrays at the frequency agile radios 20. The transmit signal at each component of an antenna array may be weighted to form beam patterns such that signal energy is radiated only at directions and/or with power (MIFTP) where transmissions can be allowed without causing harmful interference to the primary users. Similarly to the omnidirectional case, one can derive a formula for the angles (referring to FIG. 7) where transmissions can be made, taking into account the effect of estimation error.

The determining of action 1100 may include receiving from positioning device 30 the location of frequency agile radio 20c (hereafter "$L_c$"). The determining of action 1100 may also include receiving from positioning device 30 the orientation of frequency agile radio 20c (hereafter "$A_c$").

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) including two dimensional spectrum holes devoid of transmissions above a designated power at least one frequency. However, one skilled in the art will recognize that embodiments of the invention could include three dimensional and/or four dimensional spectrum holes devoid of transmission above a designated power at least one frequency. Also, for example purposes, the above explanation has focused on the example(s) including one primary transmitter. However, one skilled in the art will recognize that embodiments of the invention could include a plurality of primary transmitters, which may operate at the same frequency as or at different frequencies from each other.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A communications system comprising:
   at least one first frequency agile radio, including:
      at least one position device configured to determine a position of the at least one first frequency agile radio and generate a corresponding at least one first position signal; and
      at least one frequency agile receiver configured to measure a power of a transmission at the at least one frequency and generate a corresponding at least one power signal; and
   at least one second frequency agile radio, including:
      at least one second position device configured to determine a position of the at least one second frequency agile radio and generate a corresponding at least one second position signal;
      at least one frequency agile transmitter configured to transmit at least one transmission signal at the at least one frequency;
      at least one controller in communication with the at least one second position device, the at least one frequency agile transmitter and the at least one first frequency agile radio and configured to:
  determine a plurality of position coordinates of the at least one first frequency agile radio, based on the at least one first position signal;
  determine a plurality of signal power datums, based on the at least one power signal;
  estimate a coverage area of the at least one primary transmitter, based on the determined plurality of position coordinates and the determined plurality of signal power datums;
  determine an interference-free transmission characteristic, based on the estimated coverage area of the at least one primary transmitter and the at least one second position signal, the interference-free transmission characteristic including a maximum interference-free transmit power value; and
  control the at least one frequency agile transmitter to transmit the at least one transmission signal to at least one of the at least one first frequency agile radio in accordance with the interference-free transmission characteristic.

2. A frequency agile radio comprising:
at least one position device configured to determine a position coordinate of the frequency agile radio and generate a corresponding at least one position signal;
at least one frequency agile receiver configured to measure a power of a transmission at at least one frequency and generate a corresponding at least one power signal;
at least one controller in communication with the at least one position device and the at least one frequency agile receiver and configured to:
  determine a plurality of position coordinates of the frequency agile radio, based on the at least one position signal;
  determine a plurality of signal power datums, based on the at least one power signal, each of the signal power datums representing a power of a transmission of the at least one primary transmitter as measured by the at least one frequency agile receiver at:
    the at least one frequency; and
    one of the plurality of position coordinates;
  estimate the coverage area of the at least one primary transmitter, based on the determined plurality of position coordinates and the determined plurality of signal power datums; and
  determine an interference-free transmission characteristic, based on the estimated coverage area of the at least one primary transmitter and the at least one second position signal, the interference-free transmission characteristic including a maximum interference-free transmit power value.

3. The frequency agile radio of claim 2, wherein the estimating of the coverage area of the at least one primary transmitter includes estimating a location of the at least one primary transmitter, based on the determined plurality of position coordinates and the determined plurality of signal power datums.

4. The frequency agile radio of claim 2, wherein the estimating of the location of the at least one primary transmitter includes calculating a maximum likelihood estimator of the location of the at least one primary transmitter.

5. The frequency agile radio of claim 2, further including a spectrum detector configured to measure the received signal strength across frequency channels in a frequency range of interest.

6. The frequency agile radio of claim 2, wherein the at least one controller is further configured to estimate a spatial size of at least one spectrum hole, based on the estimated coverage area of the at least one primary transmitter, wherein the determining of the interference-free transmission characteristic is based further on the estimated spatial size of the at least one spectrum hole.

7. The frequency agile radio of claim 3, wherein the estimating of the coverage area of the at least one primary transmitter further includes estimating a transmit power of the at least one primary transmitter at the at least one frequency, based on the determined plurality of position coordinates and the determined plurality of signal power datums.

8. The frequency agile radio of claim 4, wherein the calculating of the maximum likelihood estimator includes maximizing a likelihood function relating the determined plurality of position coordinates and the determined plurality of signal power datums to the location of the at least one primary transmitter.

9. The frequency agile radio of claim 4, further including estimating a worst case location of the at least one primary transmitter, based on the estimated location of the at least one primary transmitter, the determined plurality of position coordinates and the determined plurality of signal power datums, wherein the estimating of the coverage area is based further on the estimated worst case location of the at least one primary transmitter.

10. The method of claim 6, wherein the determining of the interference-free transmission characteristic includes determining a location of the frequency agile radio.

11. The frequency agile radio of claim 7, wherein the estimating of the transmit power of the at least one primary transmitter at the at least one frequency includes calculating a maximum likelihood estimator of a combination of the location of the at least one primary transmitter and the transmit power of the at least one primary transmitter.

12. The frequency agile radio of claim 7, further including estimating a worst case location of the at least one primary transmitter, based on the estimated location of the at least one primary transmitter, the determined plurality of position coordinates and the determined plurality of signal power datums, wherein the estimating of the coverage area is based further on the estimated worst case location of the at least one primary transmitter.

13. The frequency agile radio of claim 8, wherein the likelihood function is implemented as the formula $$f_{S|L}(S) = \frac{1}{(2\pi)^{\frac{N}{2}} |\Lambda|^{\frac{1}{2}}} \exp\left\{-\frac{1}{2}(S-z)^T \Lambda^{-1} (S-z)\right\}.$$

14. The frequency agile radio of claim 9, wherein the estimating of the worst case location of the at least on primary transmitter includes estimating the lower bound on the mean squared error of the estimation of the location of the at least one primary transmitter.

15. The method of claim 10, wherein the determining of the interference-free transmission characteristic further includes estimating a minimum distance between the frequency agile radio and an edge of the at least one spectrum hole, based on the estimated spatial size of the at least one spectrum hole and the determined location of the frequency agile radio.

16. The frequency agile radio of claim 11, wherein the calculating of the maximum likelihood estimator includes maximizing a likelihood function relating the determined plurality of position coordinates and the determined plurality of signal power datums to the location of the at least one primary transmitter and the transmit power of the at least on primary transmitter.

17. The frequency agile radio of claim 12, wherein the estimating of the worst case location of the at least on primary transmitter includes estimating the lower bound on the mean squared error of the estimation of the location of the at least one primary transmitter.

18. The frequency agile radio of claim 12, further including estimating a worst case transmit power of the at least one primary transmitter at the at least one frequency, based on the estimated transmit power at the at least one frequency of the at least one primary transmitter, the determined plurality of position coordinates and the determined plurality of signal power datums, wherein the estimating of the coverage area is based further on the estimated worst case transmit power of the at least one primary transmitter at the at least one frequency.

19. The frequency agile radio of claim 14, wherein the estimating of the lower bound on the mean squared error of the estimation of the location of the at least one primary transmitter includes utilizing a Cramer-Rao bound.

20. The frequency agile radio of claim 16, wherein the likelihood function is implemented as the formula $$f_{S|\Theta}(S) = \frac{1}{(2\pi)^{\frac{N}{2}}|\Lambda|^{\frac{1}{2}}} \exp\left\{-\frac{1}{2}(S-z)^T \Lambda^{-1}(S-z)\right\}.$$

21. The frequency agile radio of claim 17, wherein the estimating of the lower bound on the mean squared error of the estimation of the location of the at least one primary transmitter includes utilizing a Cramer-Rao bound.

22. The frequency agile radio of claim 18, wherein the estimating of the worst case transmit power of the at least one primary transmitter includes estimating a lower bound on a mean squared error of the estimated transmit power at the at least one frequency of the at least one primary transmitter.

23. The frequency agile radio of claim 19, wherein the utilizing of the Cramer-Rao bound includes accounting for shadow noise and a specific propagation condition of the transmission of the at least one primary transmitter.

24. The frequency agile radio of claim 21, wherein the utilizing of the Cramer-Rao bound includes accounting for shadow noise and a specific propagation condition of the transmission of the at least one primary transmitter.

25. The frequency agile radio of claim 22, wherein the estimating of the lower bound on the mean squared error of the estimated transmit power at the at least one frequency of the at least one primary transmitter includes implementing the formula $$b = \frac{N}{\sigma_w^2} - a^T J_{L_p}^{-1} a.$$

26. The frequency agile radio of claim 23, wherein the utilizing of the Cramer-Rao bound includes implementing the formula $$J_{L_p} = \left(\frac{10\varepsilon}{\sigma_w \ln 10}\right)^2 HD^2 H^T.$$

27. The frequency agile radio of claim 24, wherein the utilizing of the Cramer-Rao bound includes implementing the formula $$J_{\Theta_p} = \frac{1}{\sigma_w^2} BGD^2 G^T B.$$

* * * * *